(12) United States Patent
Kertscher

(10) Patent No.: US 6,894,250 B2
(45) Date of Patent: May 17, 2005

(54) METHOD FOR CONTINUOUS MANUFACTURE OF DRIP IRRIGATION TUBES UTILIZING A LASER BEAM

(76) Inventor: Eberhard Kertscher, Frezin 11, 1462 Yvonand (CH)

( * ) Notice: Subject to any disclaimer, the term of this patent is extended or adjusted under 35 U.S.C. 154(b) by 0 days.

(21) Appl. No.: 10/381,637

(22) PCT Filed: Sep. 24, 2001

(86) PCT No.: PCT/CH01/00576
§ 371 (c)(1),
(2), (4) Date: Sep. 8, 2003

(87) PCT Pub. No.: WO02/26025
PCT Pub. Date: Apr. 4, 2002

(65) Prior Publication Data
US 2004/0045944 A1 Mar. 11, 2004

(30) Foreign Application Priority Data
Sep. 27, 2000 (EP) .............................. 00810892

(51) Int. Cl.⁷ .............................................. B23K 26/38
(52) U.S. Cl. .............................. 219/121.72; 219/121.71
(58) Field of Search ......................... 219/121.67, 121.7, 219/121.71, 121.72

(56) References Cited

U.S. PATENT DOCUMENTS

| | | | |
|---|---|---|---|
| 3,626,143 A | * 12/1971 | Fry | ........................ 219/121.69 |
| 3,874,598 A | 4/1975 | Havens | |
| 3,947,093 A | * 3/1976 | Goshima et al. | ............. 359/716 |
| 4,027,137 A | * 5/1977 | Liedtke | .................... 219/121.7 |
| 4,095,084 A | 6/1978 | Shutt | |
| 5,285,750 A | * 2/1994 | Molian et al. | ............... 119/174 |
| 5,684,617 A | 11/1997 | Langhans | |
| 5,744,779 A | 4/1998 | Buluschek | |
| 5,829,686 A | * 11/1998 | Cohen | ..................... 239/533.1 |

FOREIGN PATENT DOCUMENTS

| | | |
|---|---|---|
| EP | 0 378 335 A1 | 7/1994 |
| EP | 0 715 929 B1 | 11/1995 |
| JP | 59-78793 A * | 5/1984 |
| JP | 64-2794 A * | 1/1989 |
| RU | 2026787 C1 * | 1/1995 |

* cited by examiner

*Primary Examiner*—Geoffrey S. Evans
(74) *Attorney, Agent, or Firm*—Dorsey & Whitney LLP; David J. Brezner; Victor E. Johnson

(57) ABSTRACT

In a method for the continuous manufacture of drip irrigation tubes which comprise a tube body (1) into which dosing elements are set (6), a hole is created in the walling of the tube body (1). This takes place by a laser beam (13) which is directed by an optical device (16). This optical device (16) has the effect of converting the laser beam (13) into the form of a ring, a line (19) of high energy density being formed corresponding substantially to the ring shape at a separation (a) from optical device (16), in which a particle (20) is cut from the walling.

14 Claims, 3 Drawing Sheets

METHOD FOR CONTINUOUS MANUFACTURE OF DRIP IRRIGATION TUBES UTILIZING A LASER BEAM

This invention relates to a method for continuous manufacture of drip irrigation tubes.

Drip irrigation tubes are used for direct irrigation of plants. For this purpose a dosing element is installed in this tube in the vicinity of each plant, through which dosing element the water is let out of the drip irrigation tube via a bore. Through this direct drip irrigation of the individual plants a large quantity of water is not wasted unnecessarily, as usually occurs with irrigation facilities in which water is distributed through spraying installations. With drip irrigation an extremely economical system is applied; the water can be used very sparingly.

The manufacture of drip irrigation tubes of this kind takes place in a known way through extrusion of a plastic material, the dosing elements being introduced with the desired spacing into the tube during the extruding. Then a hole must be made in the correct position in the walling of the tube body allowing the drip discharge of the water.

Depending upon the application purpose, drip irrigation tubes of differing design are used. For irrigation of plants which have to be planted again every year, drip irrigation tubes are used having very thin walls and whose life is designed for a year. When replanting, new drip irrigation tubes are installed on the surface. With perennial use, drip irrigation tubes are used whose life is correspondingly longer, and which are characterized by a larger wall thickness. These tubes can likewise be installed on the surface; it is also conceivable, however, for them to be installed in the soil.

Known in the manufacture of these drip irrigation tubes is the making of the holes by means of mechanical boring devices. This method has been shown to be relatively slow, however, which affects the cost effectiveness of the manufacturing method.

Known from EP 0 715 926 <U.S. Pat. No. 5,744,779> is a method for manufacturing drip irrigation tubes in which the holes are made by means of a laser beam generated in a laser device. With this configuration, productivity can be greatly increased compared with the above-mentioned method using a mechanical boring device. The use of a laser of the Nd:YAG type, however, only allows manufacture of drip irrigation tubes with thin walling of maximally 0.6 mm since with thicker walling the energy density of the laser beam would have to be increased so much that, in addition to the walling, the dosing element located underneath would also be penetrated.

The object of the invention is therefore to create a method for continuous manufacture of drip irrigation tubes with which tubes having thicker walls can also be produced at a high production rate and thus cost effectively.

Thus drip irrigation tubes can be manufactured in a productive way whereby it is ensured that the hole in the walling is optimally designed without the material being damaged of the dosing element lying underneath, an optimal functioning of the drip irrigation tube thereby being achieved.

In an advantageous way, the tube body of the drip irrigation tube is directed during manufacture past the optical device in such a way that the region in which the hole generated with the laser beam comes to lie has substantially the spacing a from the optical device, in which region the laser beam has a line with high energy density. It is thereby achieved that in an optimal way the particle is cut out of the walling, <and> at the same time the dosing element located underneath is not damaged since in this area the energy density of the laser beam is already considerably less again than at the height of the wall.

The directing of the tube body of the drip irrigation tube past the optical device takes place at substantially continuous rate of feed. Therefore the feed drive can be of simple construction; at the same time the quality of the tube is ensured through the constant extrusion of the material.

In order to keep the measurements of the hole in the walling of the tube body as precise as possible, the optical device is preferably designed in such a way that the laser beam is directed along with the advancing tube body during the making of the hole.

Preferably a $CO_2$ laser is used for the making of holes in the walling of the tube body, by means of which optimal cutting features are achieved.

In order to fully exclude any damage to the dosing element during the making of the respective hole in the walling of the tube body, this area of the second chamber can be provided with a protective covering, consisting preferably of a metallic material, whereby the laser beam impinging on this area is reflected for the most part.

A further preferred embodiment of the invention consists in that the particle cut out by the laser beam is suctioned with a suction device, whereby this particle can be prevented from possibly being able to end up in the second chamber and possibly being able to clog the hole.

The invention will be explained more closely in the following with reference to the attached drawing.

Figure 1:
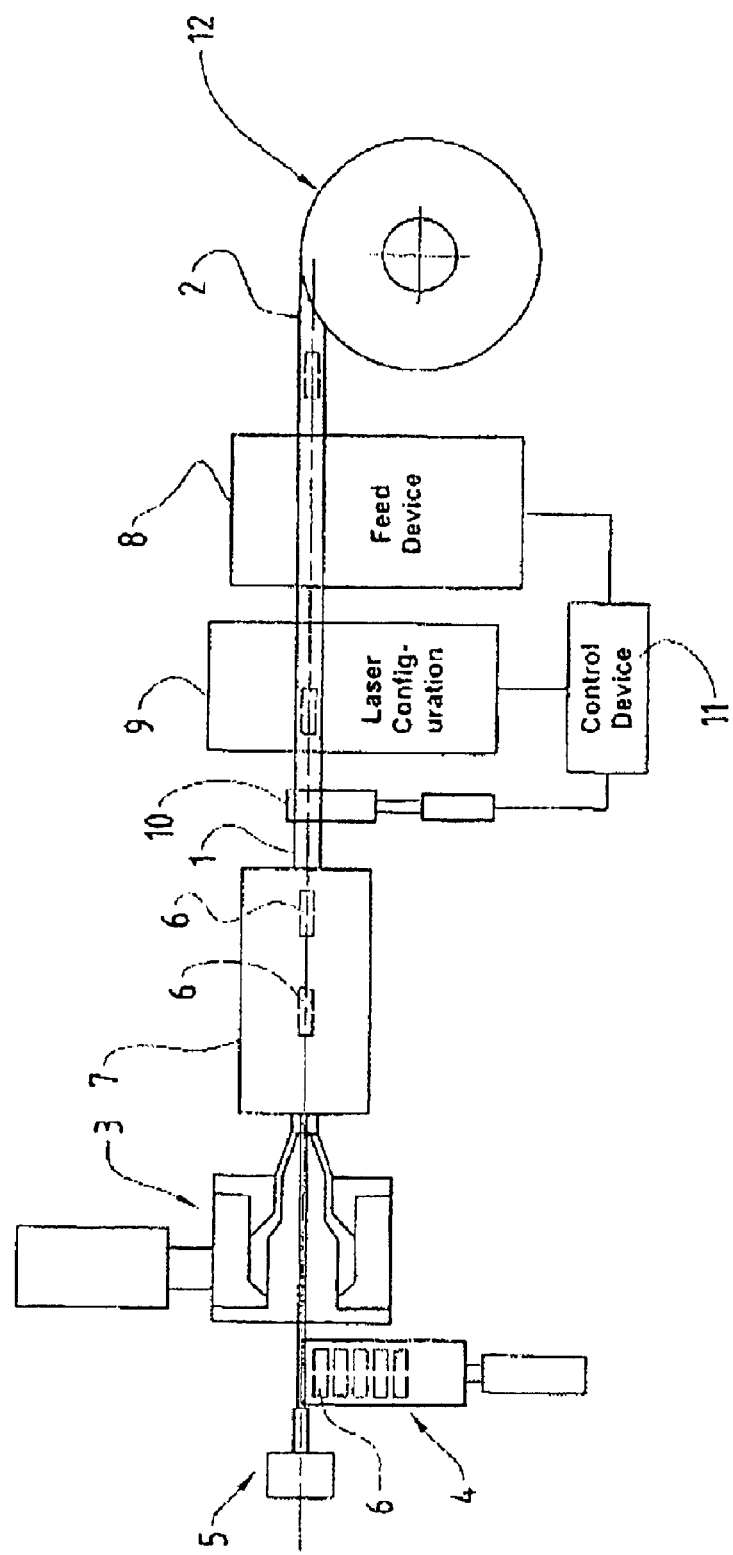
FIG. 1 shows in a schematic illustration the manufacture of the drip irrigation tube.

As can be seen from FIG. 1, the tube body 1 of the drip irrigation tube 2 is formed in a known way by an extrusion device 3 in a continuous way. Inserted in this extruded tube body 1 is a dosing element 6 in each case from a magazine 4 via a feed device 5, which dosing element has a predetermined spacing from the preceding one. The extruded tube body 1 with the inserted dosing elements 6 is then directed through a calibration and cooling device 7 in which a watertight connection is obtained between tube body 1 and dosing element 6, as will be described later.

The tube body 1 with the inserted dosing elements 6 is guided by a feed device 8 through a laser configuration 9, the rate of feed being preferably kept constant. In the laser configuration 9, the hole penetrating the walling of the tube body 1 is made by a laser beam.

Via a detector device 10, in a known way, it can be determined at which position the dosing elements 6 are disposed in the case of the tube body 1 passing through. This detector device 10 gives a corresponding signal to the control device 11, which is likewise connected to the feed device. Taking into consideration the rate of feed of the tube body 1 passing through, with a knowledge of the spacing of the detector device 10 from the laser beam in the laser configuration 9, this laser beam can be directed on the tube body 1 at the right moment, so that the hole penetrating the walling is made over the desired area of the dosing element 6. The drip irrigation tube 2 thus produced can be rolled up afterwards on a winding device 12, for example.

Figure 2:
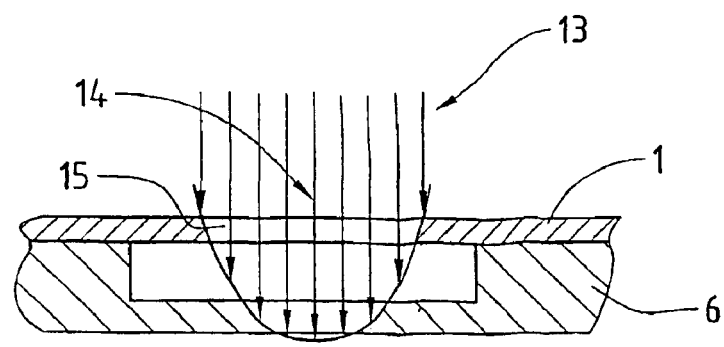
FIG. 2 shows in section an enlarged detail of the walling of the tube body with inserted dosing element in which the effects are visible when a conventional laser beam is used for making the hole.

Now, when a hole is supposed to the made in a tube body 1 of a drip irrigation tube with a common Nd:YAG or $CO_2$ laser and the thickness of the walling of the tube body 1 is more than one millimeter, for instance, the situation arises as shown in FIG. 2. The laser beam 13 hits the walling of the tube body 1. Since the laser beam 13 has the greatest energy density in its central region 14, the material of the walling of the tube body 1 is first burned, or respectively volatized, in this central region 14. A first penetration of the material of the walling of the tube body 1 thus takes place in this central region 14. Afterwards the hole 15 thus formed is extended in diameter; in the meantime, however, the high energy central region 14 of the laser beam 13 already reaches the material of the dosing element 6 located behind the walling of the tube body 1. The material is destroyed. Before the desired diameter of the hole 15 is achieved, a penetration of the dosing element 6 can take place, which is absolutely undesired, since the dosing element 6 can then no longer fulfil its function.

Figure 3:
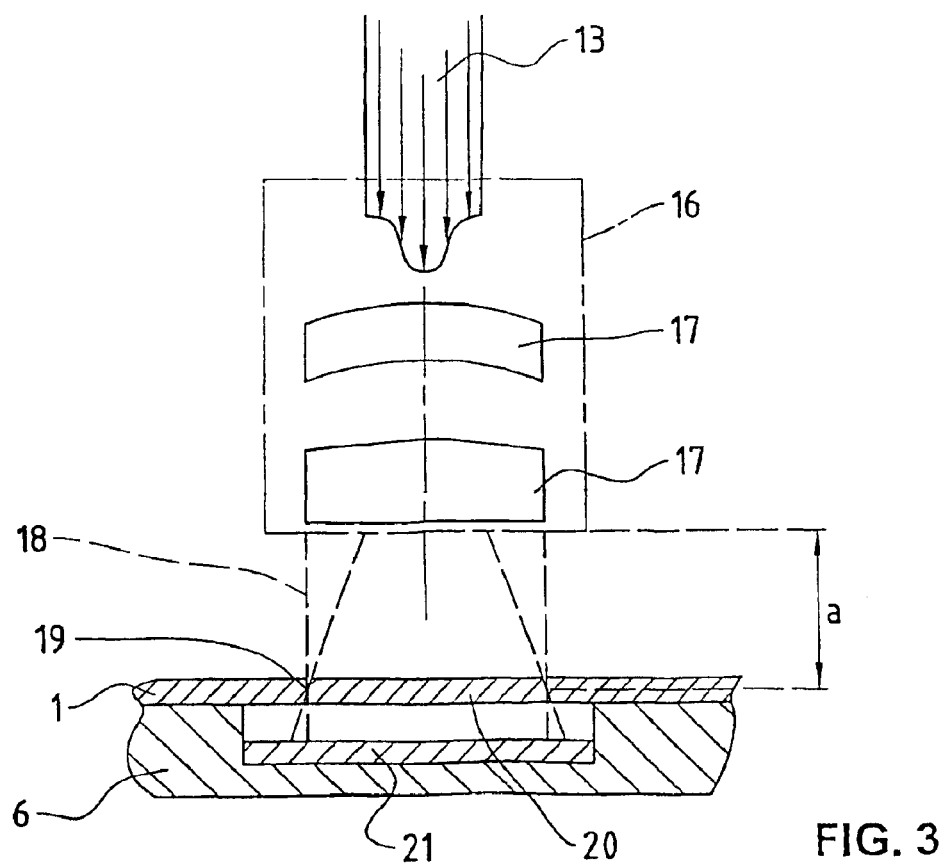
FIG. 3 shows in a schematic illustration the course of the laser beam for making the hole in the walling of the drip irrigation tube in the method according to the invention.

As can be seen from FIG. 3, an optical device 16 is disposed in the laser configuration 9 as used in the device according to FIG. 1. This optical device 16 comprises a system of lenses (e.g. an axicon), the lenses being shown only schematically. The laser beam 13 is led through this optical device 16 or respectively through the system of lenses 17. The laser beam 13 is converted here into a ring form 18. The rays are "bundled" here in such a way that quasi a line 19 (focal line) comes into being in the region where the energy density is high.

The tube body 1 is now directed past the optical device 16 in such a way that the walling of the tube body 1, in which the hole generated by the laser beam 13 comes to lie in each case, has the spacing a from this optical device 16. The ring form 18 of the laser beam 13 then cuts a particle 20 out of the walling of this tube body 1, which particle is suctioned up by a suction device (not shown) disposed immediately next to the "cutting device."

The cutting of the particle 20 out of the walling of the tube body 1 takes place over the entire circumference at the same time. As soon as the particle 20 is cut out, the laser processing can therefore be ended immediately. The beam, still reaching the material of the dosing element 6 after the cutting out of the particle, thus practically does not damage the material here at all, on the one hand owing to the very short duration, on the other hand also because the energy density of the beam in this area is already considerably less than in the region of the line 19 since the beam is already "scattered" again.

To prevent any damage to the material of the dosing element 6 in the region of the laser processing, a protective covering 21 can be used, which consists, for example, of aluminum or of another metallic material. This protective covering 21 reflects for the most part the impinging laser beam.

So that the making of the holes can take place at the greatest possible, and substantially constant, speed, the optical device is designed in such a way that the laser beam is directed along with the advancing tube body 1 during the cutting out of the particle 20. This can be achieved in a known way (not shown) through pivoting of the optical device 16; this can also be achieved by using a pivotable mirror, it being possible for the control of these movements to take place by means of the control device 11 (FIG. 1). In this way the contour of the hole will also be optimal. With this procedure drip irrigation tubes can be manufactured at high rate of production having, for instance, a diameter of about 10 to 30 mm and a wall thickness of about 0.6 to 3 mm.

The ring form 18 of the laser beam is preferably circular. Other ring shapes are also conceivable, however, which can be formed via suitable optics.

Figure 4:
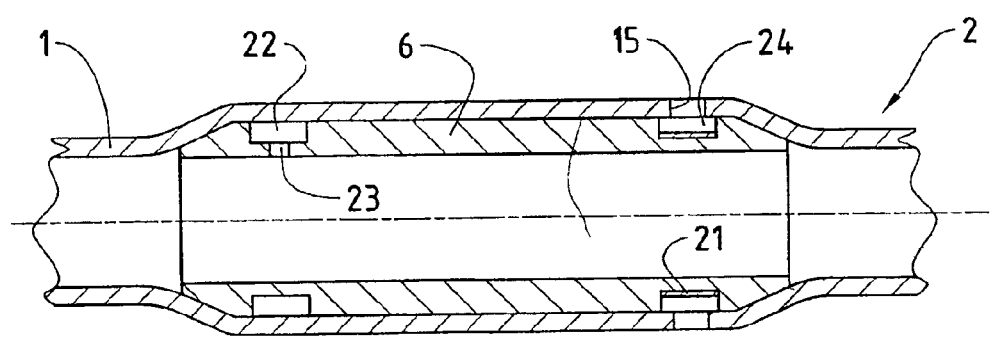
FIG. 4 shows a longitudinal section through the tube body in the region of the inserted dosing element.

Shown in FIG. 4 is a detail of a drip irrigation tube 2 in section, in which the dosing element 6 is designed as a hollow cylinder. As already mentioned, this dosing element 6 is used in the extrusion process for production of the tube body 1. In the calibrating and cooling device 7 (FIG. 1), the tube body 1 places itself on the outside of the dosing element 6 in an absolutely watertight way.

The dosing element 6 shown here has a first chamber 22 which is connected, via at least one opening 23, to the internal space of the dosing element 6, or respectively the tube body 1. The water led in through the drip irrigation tube 2 arrives via this opening 23 in the first chamber 22 of the dosing element 6, which chamber is of annular design. A second chamber 24 is disposed in the dosing element 6 spaced apart from the first chamber 22. This second chamber 24 is also of annular design in the present embodiment example. As has been described in the foregoing, the hole is made in the region of this second chamber 24 by means of laser. In a known way, a labyrinth configuration (not shown) is disposed between the first chamber 22 and the second chamber 24 in the dosing element 6. Thus the water comes out of the internal space of the tube body 1 via the opening 23 into the first chamber 22 and via the labyrinth configuration into the second chamber 24, out of which chamber it can emerge via the holes 15 and can supply the plants with water. Owing to the labyrinth configuration, the water escapes through the hole 15 only drop by drop. The number of drops per unit of time which escape through the hole 15 results from the choice of labyrinth configuration and the measurements of the holes 15.

It can be seen in this FIG. 4 that the protective covering 21 with which the floor of the second chamber 24 is provided, in order to prevent damage to the dosing element 6 during the laser processing, has the shape of a ring. The protective covering 21 could also be obtained, however, through vacuum deposition of a metal layer on the corresponding area of the dosing element 6.

Of course the dosing element 6 does not have to be of hollow cylindrical shape, as described in the foregoing. Use of a flat part as the dosing element is also conceivable, which part is stuck into the tube body during the extrusion process for producing the latter, as is shown, for example, in the previously described EP-A-0 715 926 <U.S. Pat. No. 5,744, 779>.

Polyethylene is suitable as a material for the tube body 1 of the drip irrigation tube 2. The dosing elements can also be made of this material. Other materials can certainly also be used, however, which fulfil the desired prerequisites.

What is claimed is:

1. A method for continuous manufacture of drip irrigation tubes (2), the tube bodies (1) of which are obtained by means of an extrusion step for a plastic, in which tube bodies dosing elements (6) are set during the extrusion step with a spacing from one another which dosing elements each have a first chamber connected to the interior space of the tube body (1), which first chamber is connected to a second chamber (24) provided in the respective dosing element (6), which second chamber is disposed in a sealing way on the inner surface of the tube body (1), and in which tube bodies (1) at least one hole (15) penetrating the walling is made in the area of the second chamber (24) of the respective dosing element (6)

with a laser beam (13) generated in a laser configuration (9), wherein an optical device (16) is used by means of which a laser beam (13) is directed, and whereby it is achieved that the laser beam (13) is converted into the form of a ring, a line (19) of high energy density being formed corresponding substantially to the ring shape at a separation (a) from the optical device (16), whereby a particle (20) is cut from the walling.

2. The method according to claim 1, wherein the tube body (1) of the drip irrigation tube (2) is directed past the optical device (16) in such a way that the region in which the hole (15) generated with the laser beam (13) comes to lie in each case has substantially a constant spacing from the optical device (16).

3. The method according to claim 2, wherein the directing of the tube body (1) of the drip irrigation tube (2) past the optical device (16) is undertaken with substantially constant rate of feed.

4. The method according to claim 3, wherein the optical device (16) is designed in such a way that the laser beam (13) is directed along with the advancing tube body (1) during the making of the hole (15).

5. The method according to claim 4, wherein a $CO_2$ laser is used for the making of holes (15) in the walling of the tube body (1).

6. The method according to claim 5, wherein a floor of the second chamber (24) is provided with a protective covering (21) at least in the region of each hole (15) able to be made in the walling of the tube body (1).

7. The method according to claim 6, wherein the particle (20) cut out by the laser beam (13) is suctioned with a suction device.

8. The method according to claim 7, wherein the tube body (1) is made of polyethylene.

9. The method according to claim 1, wherein the tube body (1) is made of polyethylene.

10. The method according to claim 1, wherein the directing of the tube body (1) of the drip irrigation tube (2) past the optical device (16) is undertaken with substantially constant rate of feed.

11. The method according to claim 1, wherein the optical device (16) is designed in such a way that the laser beam (13) is directed along with the advancing tube body (1) during the making or the hole (15).

12. The method according to claim 1, wherein a $CO_2$ laser is used for the making or holes (15) in the walling of the tube body (1).

13. The method according to claim 1, wherein a floor of the second chamber (24) is provided with a protective covering (21) at least in the region of each hole (15) able to be made in the walling of the tube body (1).

14. The method according to claim 1, wherein the particle (20) cut out by the laser beam (13) is suctioned with a suction device.

* * * * *